United States Patent [19]

Smith et al.

[11] Patent Number: 4,812,102

[45] Date of Patent: Mar. 14, 1989

[54] STORAGE AND RETRIEVAL MACHINE FOR TOTE PANS

[75] Inventors: Harry E. Smith, Concord, Ohio; William E. Riedner, Battle Creek, Mich.

[73] Assignee: Jervis B. Webb Company, Farmington Hills, Mich.

[21] Appl. No.: 114,688

[22] Filed: Oct. 29, 1987

[51] Int. Cl.$^4$ .............................................. B65G 47/00
[52] U.S. Cl. ..................... 414/280; 414/282; 414/661; 414/663; 414/785
[58] Field of Search ............. 414/273, 274, 275, 280, 414/281, 282, 286, 492, 659, 660, 661, 664, 662, 668, 785, 663

[56] References Cited

U.S. PATENT DOCUMENTS

| | | | |
|---|---|---|---|
| 3,237,789 | 3/1966 | Guilbert, Jr. | 414/661 |
| 4,010,855 | 3/1977 | Smith | 414/280 X |
| 4,148,404 | 4/1979 | Heisler | 414/280 X |
| 4,352,622 | 10/1982 | Wieschel | 414/661 X |
| 4,358,239 | 11/1982 | Dechantsreiter | 414/661 |
| 4,690,602 | 9/1987 | Castaldi et al. | 414/661 X |

*Primary Examiner*—Frank E. Werner
*Attorney, Agent, or Firm*—Joseph W. Farley

[57] ABSTRACT

A machine for transporting tote pans to and from storage compartments arranged longitudinally in vertical rows along an aisle includes a vertically movable carriage provided with a pair of longitudinally spaced, transversely extending tote pan supporting guides which are transversely shiftable between centered and tote pan transfer positions. Associated with the guides is a pair of endless chains, each arranged in a horizontal orbit extending below one of the guides around the sides and ends thereof and carrying a pair of equidistantly spaced pins projecting above the support level of the guide, the pins on one chain being aligned longitudinally with the pins on the other chain. The chains are driven simultaneously in opposite directions on a storage or retrieval cycle synchronously with a cam which shifts the support assembly transversely. A tote pan having a handle slot at each of its ends is pushed into or pulled from a storage compartment by a set of longitudinally aligned pins engaging one of the handle slots.

6 Claims, 4 Drawing Sheets

STORAGE AND RETRIEVAL MACHINE FOR TOTE PANS

SUMMARY OF THE INVENTION

This invention relates to improvements in a storage and retrieval machine for transporting tote pans to and from storage compartments arranged longitudinally in vertical rows along an aisle. Each tote pan has a bottom, a pair of sides and a pair of ends, each end being provided with a handle which projects outwardly and downwardly from the end and forms a downwardly facing slot.

Such a storage and retrieval machine conventionally comprises a reversibly driven wheeled truck mounted on a rail extending lengthwise of the aisle, the truck having a vertical mast which serves as a guide for a vertically movable carriage provided with structure for supporting a tote pan and for transferring the tote pan transversely of the aisle to or from a particular storage compartment on either side of the aisle.

A prior example of a storage and retrieval machine of the present type is shown in U.S. Pat. No. 4,352,662. The structure for transferring a tote pan consists of a pair of reversible, counterrotating endless chains mounted on the carriage for movement about horizontal orbital paths. Attached to each chain is a pusher pin displaced outwardly from the orbital path on a short arm, and a puller pin displaced outwardly from the orbital path on a longer arm. The pusher pins are adapted to engage the outer face of a tote pan handle and push the tote pan from the support structure on the carriage into a storage compartment; the puller pins are adapted to enter the handle slot and pull the tote pan by the handle from a storage compartment onto the carriage support structure. With this arrangement a tote pan being pushed into storage is not positively engaged and controlled, and may be stored in an unretrievable position.

In another prior example shown in U.S. Pat. No. 4,358,239, a chain mounted puller carried by a shuttle on the carriage is movable in a vertical orbital path upwardly into engagement with the handle slot of a tote pan, horizontally to push or pull the tote pan, and downwardly out of engagement with the tote pan handle slot. The shuttle is also movable transversely on the carriage relative to the tote pan supporting structure thereof, toward and away from the storage compartments during a storage and a retrieval operation.

The storage and retrieval machine of the present invention has a vertically movable carriage comprising a base frame, and a tote pan support assembly mounted on the base frame for movement transversely of a storage aisle toward and away from vertical rows of storage compartments on either side of the aisle. The tote pan support assembly has a pair of longitudinally spaced transversely extending guides adapted to be engaged by side and bottom portions of a tote pan. Tote pan engaging means are mounted on the tote pan support assembly for moving a tote pan between the guides and a selected one of the storage compartments. These engaging means comprise a pair of endless chains, each associated with one of the parallel guides below the tote pan support level thereof and trained about a pair of sprockets carried by the support assembly on vertical axes located adjacent to the opposite ends of the associated one of the parallel guides. Each of the endless chains has a horizontal orbit composed of inner and outer reaches extending parallel to and on opposite sides of the associated guide, and opposite arcuate end reaches extending beyond the ends of the associated guide and defined by the associated pair of sprockets. Attached to each endless chain is a pair of tote pan engaging pins projecting upwardly from the chain above the tote pan support level of the associated guide, the pair of pins on one of the chains being in relative longitudinal positional alignment with the pair of pins on the other of the chains.

Reversible driving means is adapted to operate the support assembly in a storage or retrieval cycle from a normal position and return thereto, the normal position being one in which the support assembly is centered transversely on the base frame and in which the pair of pins on each of the pair of chains is disposed on the arcuate end reaches thereof in transverse alignment with the associated parallel guide. The driving means includes chain propelling means for synchronously moving the pair of chains in opposite directions through a complete orbit in each cycle, and includes shifting means for simultaneously moving the support assembly transversely on the base frame from the normal centered position to a tote pan transfer position at the midpoint of each cycle.

In a storage cycle, a tote pan supported on the parallel guides with its handle slots engaged by all of the pins in their centered position, is disengaged by the set of pins at one end of the tote pan moving from the arcuate end reaches at that end of the tote pan to the outer reaches of the chains, is pushed by the set of pins at the other end of the tote pan moving on the inner reaches of the chains, and is disengaged from the pushing pins as they move from the inner to the outer reaches around corresponding arcuate end reaches adjacent to the storage compartment as the support assembly passes through its tote pan transfer position.

In a retrieval cycle, a tote pan in a storage compartment and having one of its handle slots adjacent to the aisle, is engaged by a longitudinally aligned set of pins on the chains moving from the outer reaches around corresponding arcuate end reaches adjacent to the storage compartment and entering the one handle slot as the support assembly passes through the tote pan transfer position. The tote pan is then pulled onto the parallel guides as the handle engaging set of pins move on the inner reaches of the chains and the support assembly returns to the centered position.

Preferably, the means for shifting the support assembly comprises a circular cam eccentrically mounted on the support assembly and engaging a pair of parallel reaction members on the base frame, the circular cam being driven by the reversible driving means in synchronism with the chains. All storage and retrieval motions are thus coordinated. A tote pan on the support assembly is always positively engaged in one handle slot by a pin on each of the chains; and, when the support assembly is in normal centered position, both handle slots of a tote pan thereon are engaged by a pin on each of the chains.

Other features and advantages of the invention will appear from the description to follow of the embodiment shown in the accompanying drawings.

DETAILED DESCRIPTION

Figure 1:
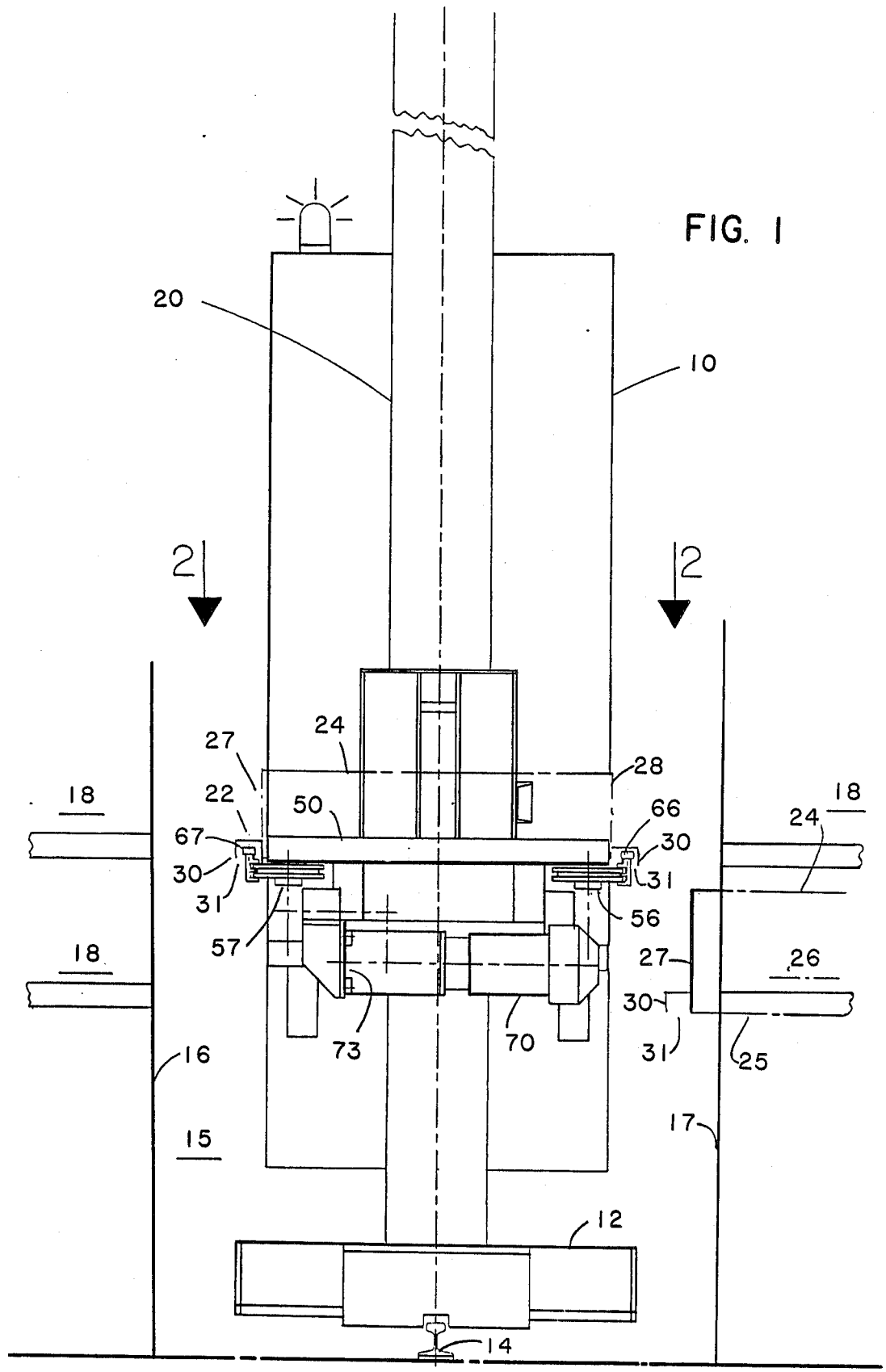
FIG. 1 is an elevation taken transversely of an aisle of a storage facility, schematically showing storage compartments and a storage and retrieval machine having a vertically movable carriage equipped with the tote pan handling mechanism of the invention.

In FIG. 1, a storage and retrieval machine 10 includes a base truck 12 adapted to travel on a rail 14 extending longitudinally of an aisle 15 bordered by rack structures 16 and 17 which provide a plurality of storage compartments 18 arranged in vertical rows along the aisle. Mounted on the truck 12 is a vertical mast 20 which serves as a guide for a vertically movable carriage 22, the mast 20 being stabilized by an upper track (not shown). Separate reversible drive motors (not shown) are employed to move the base truck 12 back and forth along the rail 14 and to move the carriage 22 up and down along the mast 20. The foregoing elements are conventional and hence are not shown in greater detail. They enable tote pans 24 to be transported by the machine 10 to and from selected ones of the storage compartments 18. Each tote pan 24 has a bottom 25, a pair of sides 26, and a pair of ends 27 and 28, each provided with an outwardly and downwardly projecting handle 30 forming a downwardly facing slot 31 extending between the sides 26.

Figure 2:
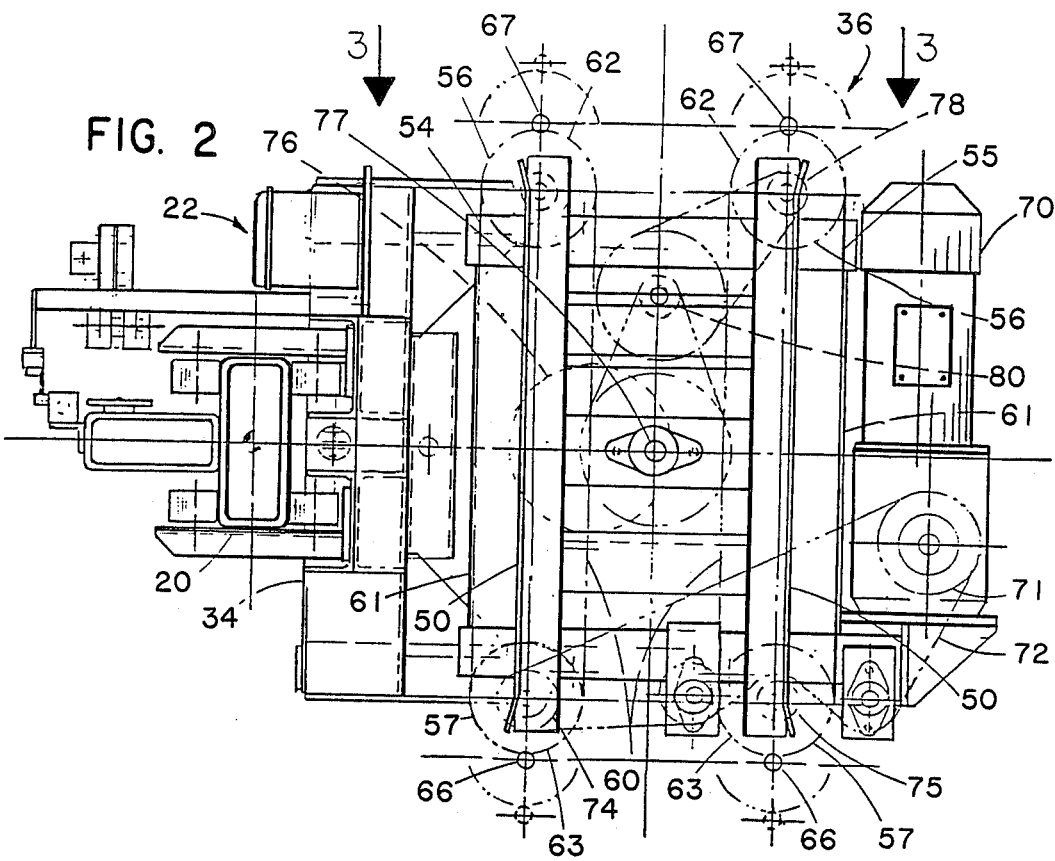
FIG. 2 is a plan view of the carriage, taken as indicated by the arrows 2—2 of FIG. 1.
Figure 3:
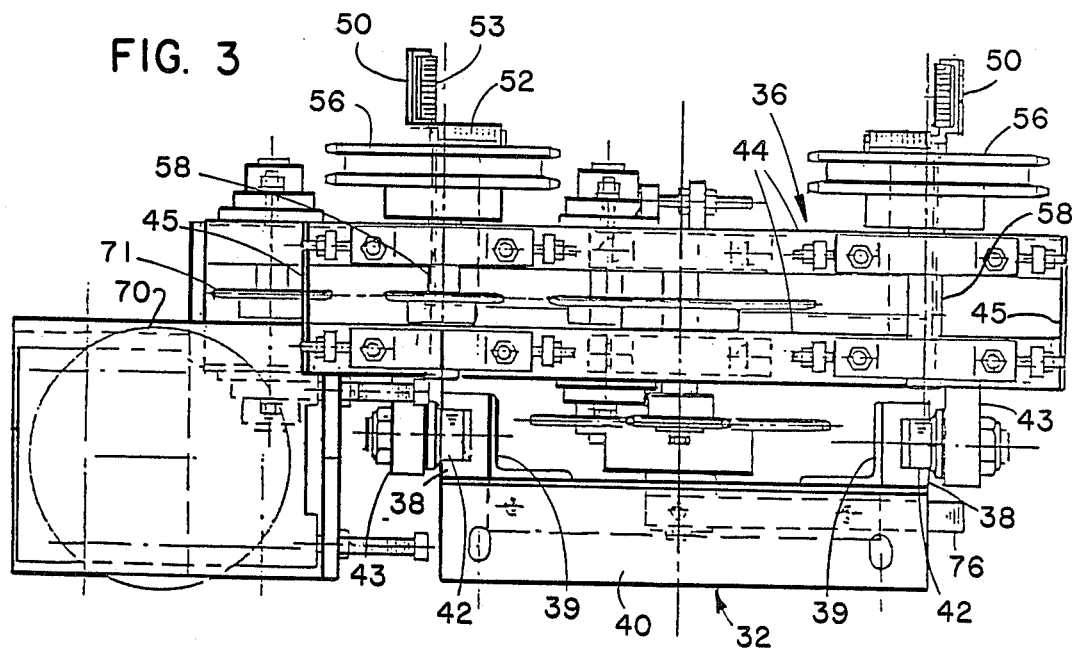
FIG. 3 is a longitudinal elevation of the carriage, taken as indicated by the arrows 3—3 of FIG. 2.
Figure 4:
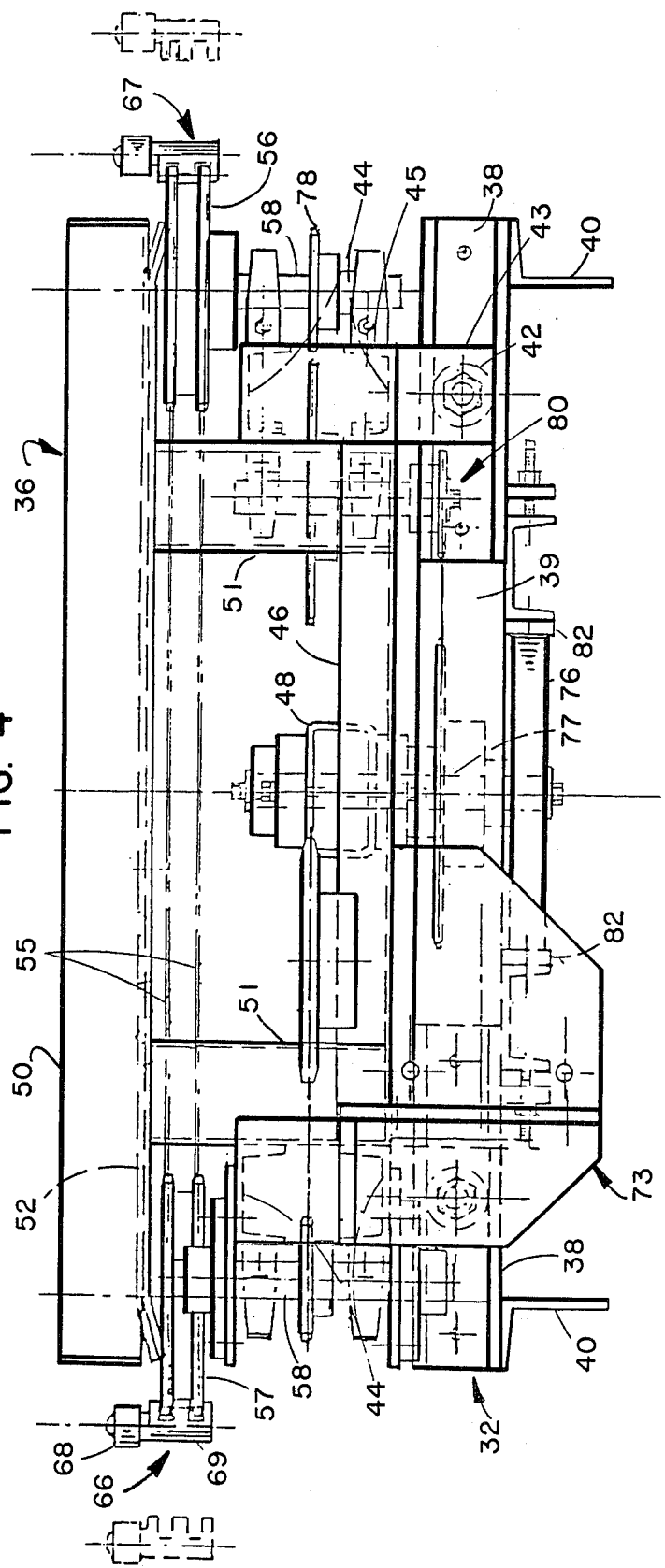
FIG. 4 is a transverse elevation of the carriage.

The present invention is directed to features of the vertically movable carriage 22, best shown in FIGS. 2-4. The carriage 22 comprises a base frame 32 connected to structure 34 (FIG. 2) which engages the mast 20, and a tote pan support assembly 36 mounted on the base frame 32 for transverse movement toward and away from the storage compartments 18 of the rack structures 16 and 17. As shown in FIGS. 3 and 4, the base frame 32 includes C-shaped tracks 38 connected to transverse frame members 39 in turn fixed to longitudinal frame members 40 attachable to the structure 34. Each track 38 is engaged by a roller 42 mounted on a bracket 43 fixed to the base of the lower of a pair of channel section, longitudinally extending members 44, connected in vertically spaced relation by end plates 45, and provided near the transverse ends of the support assembly 36. Transverse longitudinally spaced members 46 connect the lower of the members 44, and a tubular member 48 extends between the members 46 centrally between the transverse ends of the support assembly 36.

A pair of longitudinally spaced, transversely extending parallel guides 50 are each supported by a pair of uprights 51 connected to the end members 44 of the support assembly. Each guide 50 is provided with low friction support and guide surfaces 52 and 53 adapted to be engaged by bottom and side surface portions of a tote pan 24.

Tote pan engaging means are mounted on the support assembly 36 for moving a tote pan 24 between the parallel guides 50 and a selected one of the storage compartments 18. These means comprise a pair of double strand endless chains 54 and 55. Each of the chains 54 and 55 is associated with one of the guides 50, is located below the tote pan supporting surface 52 thereof, and is trained about a pair of dual sprockets 56 and 57. Each of the sprockets is rotatable on a vertical axis defined by a shaft 58 mounted in a pair of bearings attached to the end members 44, the rotational axes of the sprockets 56 and 57 being located adjacent to the oppsoite ends of the associated one of the guides 50. Each chain 54 and 55 thus has a horizontal orbit composed of inner and outer reaches 60 and 61 extending parallel to and on opposite sides of the associated guide 50, and has arcuate end reaches 62 and 63 extending outwardly of each end of the associated guide 50.

Attached to each of the chains 54 and 55 is a pair of tote pan engaging pins 66 and 67, equidistantly spaced along the chain. Each of the pins preferably consists of a roller 68 carried by a fitting 69 secured to the chain strands in substantially centered relation therewith, as shown in FIG. 4, and projecting upwardly above the level of the support surface 52 of the guides 50. The pair of pins on the chain 54 is in relative longitudinal positional alignment with the pair of pins on the chain 55 so that the pins 66 of the two chains 54 and 55 form one set or pair of longitudinally aligned pins, and the pins 67 of the two chains form another such set.

A reversible motor-reducer unit 70 is mounted on a bracket 73 of the tote pan support assembly 36 for operating it on storage or retrieval cycles, described below, the unit 70 having an output sprocket 71. A drive chain 72, connected to the output sprocket 71 and reversely engaging driven sprockets 74 and 75 mounted on the shafts 58 for the sprockets 57 of the chains 54 and 55, provides a chain propelling means for synchronously moving the pair of chains 54 and 55 in opposite directions. Shifting means are also provided for simultaneously moving the support assembly 36 transversely on the base frame 32; and in the construction shown comprise a circular cam 76 eccentrically mounted on a vertical, centrally disposed shaft 77 driven from a take-off sprocket 78 through an intermediate set of reduction sprockets 80, the cam 76 engaging a pair of parallel reaction members 82 mounted on the base frame 32.

Figure 5:
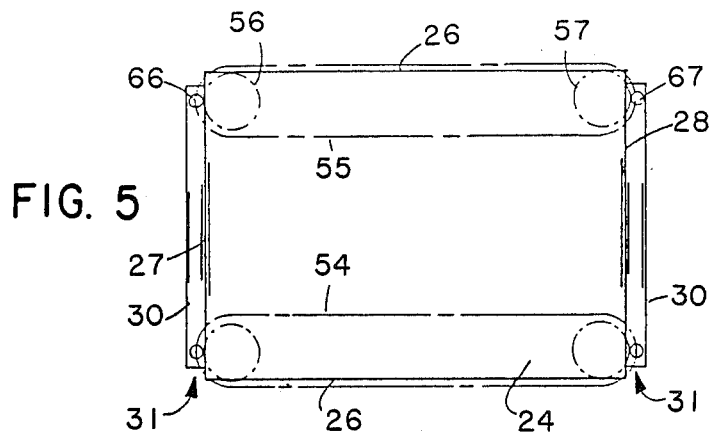
FIG. 5 is a schematic illustration of the tote pan support assembly in normal centered position with a tote pan thereon.

FIGS. 1-4 show the tote pan support assembly 36 in a normal position centered transversely on the base frame 32 and with the pins 66 and 67 on each of the chains 54 and 55 disposed in transversely aligned relation with the associated one of the guides 50. This normal position is schematically illustrated in FIG. 5. In this normal position, the handle slot 31 at each end of a tote pan 24 supported on the guides 50 is engaged by the longitudinally aligned sets of pins 66 and 67 on the chains 54 and 55, thus positively positioning and retaining the tote pan on the support assembly.

From this normal position, the support assembly is operated by the reversible drive unit 70 in a storage or retrieval cycle, and is returned to the normal position at the end of each cycle. In each cycle the chains 54 and 55 are moved in opposite directions, each through a complete orbit so that the pins 66 and 67 are returned to their starting positions at the end of the cycle. In each cycle, the shifting means cam 76 is rotated 180°, thereby simultaneously moving the support assembly 36 on the base frame transversely in one direction or the other to a tote pan transfer position at the midpoint of the cycle.

Figure 6:
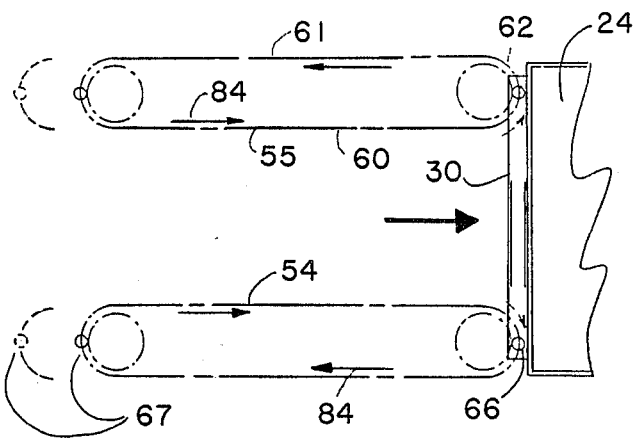
FIG. 6 is a schematic illustration of the transfer of a tote pan from the tote pan support assembly to a storage compartment.

FIG. 6 schematically illustrates the midpoint of a storage cycle in which a tote pan 24 is moved from the normal position of FIG. 5 to a storage compartment of the right hand rack structure 17. Movement of the chains 54 and 55 in the directions indicated by the arrows 84 has resulted in the set of pins 67 disengaging from the handle slot at the right hand end of the tote pan. The tote pan has been pushed along the guides 50 into the storage compartment by the set of pins 66 engaging the handle slot at the left hand end of the tote pan and moving along the inner reaches 60 of the chains 54 and 55. In FIG. 6, the support assembly 36 is passing through its tote pan transfer position, the set of pins 66 is moving to the outer reaches 61 of the chains around the corresponding arcuate end reaches 62, and the tote pan is about to be disengaged from the set of pins 66 in a positively defined storage position.

Figure 7:
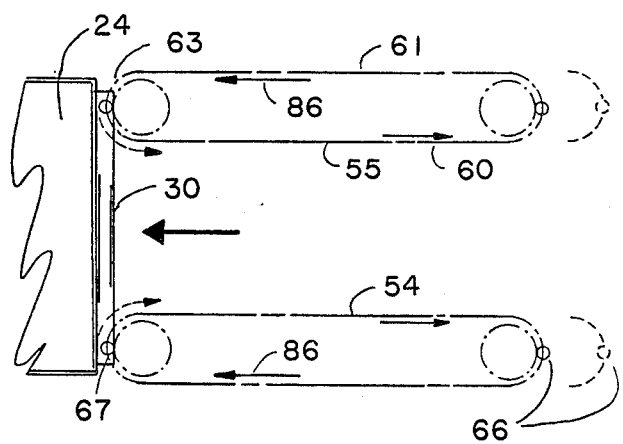
FIG. 7 is a schematic illustration of the transfer of a tote pan from a storage compartment to the tote pan support assembly.

FIG. 7 schematically illustrates the midpoint of a retrieval cycle in which a tote pan is transferred from a storage compartment of the left hand rack structure 16 to the guides 50 of the support assembly 36. The tote pan handle slot 31 adjacent the aisle is engaged by the set of pins 67 moving in the direction of the arrows 86 from their normal FIG. 5 position along the outer chain reaches 61 and around the corresponding end reaches 63 as the support assembly 36 passes through its tote pan transfer positon. The tote pan will be pulled onto the guides 50 as the handle engaging set of pins 67 move along the inner reaches 60 of the chains and the support assembly 36 returns to the normal FIG. 5 position, the other set of pins 66 then engaging the handle slot 31 at the left hand end of the tote pan.

The synchronized movements of the chains 54 and 55 and shifting movements of the support assembly result in uniform acceleration and deceleration of a tote pan during a transfer cycle. Positive control of tote pan movement is obtained, and the relative position of a tote pan to the support assembly is defined by engagement between at least one set of pins 66 or 67 and one tote pan handle slot at all times during a transfer cycle.

We claim:

1. A storage and retrieval machine for transporting tote pans to and from storage compartments arranged longitudinally in vertical rows along an aisle; each tote pan having a bottom, a pair of sides and a pair of ends each provided with a handle in the form of a downwardly facing slot; and said machine including a vertically movable carriage comprising:
   a base frame;
   a tote pan support assembly mounted on said base frame for transverse movement toward and away from said storage compartments;
   said tote pan support assembly having a pair of longitudinally spaced transversely extending parallel guides adapted to be engaged by side and bottom portions of a tote pan;
   tote pan engaging means mounted on said tote pan support assembly for moving a tote pan between said guides and a selected one of said storage compartments, said engaging means comprising
   a pair of endless chains each associated with one of said pair of parallel guides below the tote pan support level thereof, each chain being trained about a pair of sprockets carried by said support assembly on vertical axes located adjacent to the opposite ends of the associated one of said parallel guides and having inner and outer reaches extending parallel to and on opposite sides of said one guide and having opposite arcuate end reaches extending outwardly of each end of said one guide;
   a pair of tote pan engaging pins attached to each chain in equidistantly spaced relation, the pair of pins on one of said chains having relative longitudinal positional alignment with the pair of pins on the other of said chains, said pins projecting upwardly from said chains above the support level of said guides;
   said support assembly having a normal position centered transversely on said base frame and in which normal position the pair of pins on each of said pair of chains is disposed in substantially transversely aligned relation with the associated one of said pair of parallel guides; and
   reversible driving means for operating said support assembly in a storage or retrieval cycle from said normal position and return thereto, said driving means including chain propelling means for synchronously moving said pair of chains in opposite directions with each chain making a complete orbit about its pair of sprockets during said cycle, and shifting means driven by said driving means for simultaneously moving said support assembly transversely on said base frame from said normal position to a tote pan transfer position at the midpoint of said cycle, whereby in a storage cycle a tote pan supported on said parallel guides and having its handle slots engaged by said pins is pushed into a storage compartment by a longitudinally aligned pair of pins on said chains moving on the said inner reaches thereof and is disengaged from said aligned pins moving to said outer reaches on corresponding arcuate end reaches thereof adjacent to the storage compartment as said support assembly passes through said tote pan transfer position, and
   whereby in a retrieval cycle a tote pan in a storage compartment and having one of its handle slots adjacent said aisle is engaged by a longitudinally aligned pair of pins on said chains moving from said outer reaches around corresponding end reaches thereof adjacent to the storage compartment and entering opposite ends of said one handle slot as said support assembly passes through said tote pan transfer position, and said tote pan is pulled onto said parallel guides as the longitudinally aligned, handle engaging pair of pins move on the inner reaches of said chains and the support assembly returns to the centered position.

2. A storage and retrieval machine according to claim 1 wherein said pair of chains each consist of two spaced vertically aligned chain strands, and the pair of pins of each chain is connected to the said chain strands thereof in substantially centered relation therewith.

3. A tote pan storage and retrieval machine according to claim 1 wherein said shifting means comprises a cam rotatably mounted on said support assembly, reaction means on said base frame engaged by said cam, and cam drive means for rotating said cam in response to movement of said chains.

4. A tote pan storage and retrieval machine according to claim 3 wherein said cam is an eccentrically mounted circular cam and said reaction means comprises a pair of parallel reaction members engaged by said circular cam and operable to cause movement of said support assembly to tote pan transfer positions on either side of said aisle in response to rotation of said circular cam in opposite directions.

5. A tote pan storage and retrieval machine according to claim 4 wherein said cam drive means comprises sprocket and chain means connecting said circular cam to said reversible driving means for rotating said circular cam 180° in each operating cycle of said support assembly.

6. A tote pan storage and retrieval machine according to claim 4 wherein at the completion of a retrieval cycle the handle at each end of the retrieved tote pan is engaged by a longitudinally aligned pair of pins on said chains in said normal position.

* * * * *